United States Patent [19]

Chi

[11] Patent Number: 4,692,857

[45] Date of Patent: Sep. 8, 1987

[54] METHOD AND APPARATUS FOR PROTECTING PRESS FROM BEING DAMAGED BY OVERLOAD CONDITIONS

[76] Inventor: Charles H. Chi, 218 Chung Hua W. Road, Chang Hua, Taiwan

[21] Appl. No.: 751,361

[22] Filed: Jul. 1, 1985

[30] Foreign Application Priority Data

Jun. 18, 1984 [TW] Taiwan ................................ 7324604

[51] Int. Cl.$^4$ ........................ G06F 15/46; G05B 9/02; B30B 15/28

[52] U.S. Cl. ........................................ 364/184; 72/21; 72/31; 100/53; 100/99; 364/476

[58] Field of Search ................................ 364/184–187, 364/476, 505, 506, 508; 100/35, 43, 53, 99; 72/6–8, 11, 19, 21, 26, 31

[56] References Cited

U.S. PATENT DOCUMENTS

| | | | |
|---|---|---|---|
| 3,987,283 | 10/1976 | Moeller | 364/185 |
| 4,116,050 | 9/1978 | Tanahashi et al. | 100/99 X |
| 4,148,203 | 4/1979 | Farazandeh et al. | 72/21 |
| 4,274,282 | 6/1981 | Budraitis et al. | 100/99 X |
| 4,429,627 | 2/1984 | Edso | 100/53 X |
| 4,453,421 | 6/1984 | Umano | 100/99 X |
| 4,461,182 | 7/1984 | Jones, Jr. et al. | 100/99 X |

*Primary Examiner*—Joseph Ruggiero
*Attorney, Agent, or Firm*—Ladas & Parry

[57] ABSTRACT

The present invention discloses method and apparatus of protecting a press from being damaged not only under the pressure overload condition, but also under the torsion, power, and energy overload conditions by detecting means for detecting the angular displacement of the crank shaft or the fly wheel of the press, and by means of a digital information processor or a microcomputer for calculating the angular velocity, angular acceleration, pressure, torsion, power, and energy load values, and for monitoring the four overload conditions. When at least one of the overload conditions occurs, the digital information processor will immediately send out an overload signal to effect the proper protecting process, including braking the press and releasing the hydraulic buffer means of the press to reduce the impulse of the press.

11 Claims, 5 Drawing Figures

METHOD AND APPARATUS FOR PROTECTING PRESS FROM BEING DAMAGED BY OVERLOAD CONDITIONS

BACKGROUND OF THE INVENTION

The present invention relates to a method and apparatus for protecting a press from being damaged by overload conditions, and more particularly to a method and apparatus which utilize a digital circuit to detect the angular velocity, angular displacement, and angular acceleration, and then utilize a digital information processing circuit to calculate a pressure load, torsion load, power load, and energy load based on the detected values. When at least one of the calculated loads exceeds its respective permitted safe limit, the digital information processing circuit will effect a braking of the press, and release hydraulic buffer means of the press to protect the press and die from suffering damage.

In the operation of a press, any overload conditions will result in the locking of the die and the ram of the press, which may cause the press to be distorted, to lose its precision, and to suffer damage. Therefore, several protecting ethods have been proposed in the art, and the following are the prevalent protecting methods;

(a) A hydraulic buffer device is provided within the ram of the press for relieving high pressure oil to reduce the impulse of the ram when the working pressure of the ram exceeds a pre-set pressure limit.

(b) A strain measuring device, such as a strain gauge or load cell, is mounted on the press to effect the braking of the press when the measured strain of the press exceeds a pre-set value.

(c) A buffer mechanism is mounted within the ram. When the working pressure of the ram exceeds a pre-set pressure limit, the buffer mechanism will be broken to protect the ram from locking into the die.

However, only when the pressure overload condition occurs can the protecting methods mentioned above stop the press. When suffering the other possible overload conditions, however, such as torsion overload, power overload, and energy overload, the press will still suffer damage. Thus, the method and apparatus which can protect the press from damage under pressure, torsion, power, and energy overload conditions is eagerlywished for.

With reference to FIG. 1, there is shown a press capacity curve A and three overload states. The ordinate represents the press capacity of the press, while the abscissa represnts the distance away from the lower dead center. From the press capacity curve A, the section from the origin to the distance X is the working stroke of maximum pre-set pressure of the press, and occupies only a small part of the entire working stroke.

A curve B represents the pressure overload curve. The pressure overload may occur, for example, when the degree of the hardness of the work piece is too great, or when the ram cannot press the work piece smoothly, with the result that the pressure suddenly increases and exceeds the maximum pre-set pressure.

A curve C represents the torsion overload curve. The torsion overload may occur, for example, when a hard wrench is inadvertently placed upon the die. In this case, if the wrench has a height, e.g. Y, and the height Y is larger than the distance X, at the distance Y away from the lower dead center, the allowed pressure value of the capacity curve A is not high enough to withstand the working pressure. Although the working pressure does not exceed the maximum pre-set pressure at this time, the torsion withstood by the crank shaft has exceeded the pressure the capacity curve A can provide, whereby resulting in the torsion overload condition.

In the drawing the curve D represents a power overload curve. The power overload condition may occur, for example, when a soft and large object, such as a wood block, is inadvertently placed on the die. In this case, if the height of the wood block is Z, and is larger than the distance X, at the distance Z since the wood block is soft, the wood block can be continuing compressed by the press pressure, and thus absorbs and stores the press energy therein. The area encompassed by the curve D is larger than the area encompassed by the curve B as shown in FIG. 1, that is to say, within the wood block, a greater amount of press energy is absorbed than the press can provide. To be more specific, the drive motor of the press can only provide an energy of fixed power to store in the fly wheel. If the amoutn of energy lost is one working stroke of the ram is greater than the amount of fixed energy the drive motor can provide, the power overload condition occurs, and results in the velocity of the crank shaft gradually decreasing until the crank shaft stops, and the ram is locked with the die.

In addition, if the drive motor cannot provide the fly wheel with sufficient energy due to some fault, the energy stored in the fly wheel will be lower than the desired amount. Consequently, there is insufficient press energy than is needed for one working stroke, and the energy overload condition occurs.

According to the above description, the problems confronting the conventional protecting methods are as follows:

(1) Since, at the moment when the torsion, power, and energy overload conditions occurs, the pressure does not exceed the maximum pre-set pressure, the conventional protecting methods cannot effect the protecting process. As a result, the press will still be damaged under these overload conditions.

(2) In the conventional protecting methods, the oil pressure in the hydraulic buffer device must be lower than the maximum working pressure, resulting in the weakening of the rigidity of the ram structure. Consequently, the press error increases, and the punch-through phenomenon, which will damage the die, may occur.

(3) In the structure strain measuring method, a different measuring point effects the measuring result, above all, in the C-frame press.

(4) In the mechanism measuring method, repair is difficult.

SUMAMRY OF THE INVENTION

The primary object of the present invention is to provide a method and apparatus for protecting a press from damage which method and apparatus can bring into effect the protecting process, including braking the press and releasing the hydraulic buffer means mounted within the ram of the press, once at least one of the pressure, torsion, power, and energy overload conditions has occurred.

The other object of the present invention is to provide a protecting method and apparatus of the above character, which utilize a digital information processor to determine whether the overload conditions have occured, and to control directly the oil relieving valve of the hydraulic buffer means. Therefore, the oil pressure of the hydraulic buffer means can exceed the press capacity of the press, so that the rigidity of the entire ram structure is reinforced.

In accordance with the present invention, a method of protecting a press, which includes a fly wheel, a crank shaft connected with the fly wheel, a ram having hydraulic buffer means mounted therein connected with the crank shaft, and braking means, from being damaged by pressure overload, torsion overload, energy overload, or power overload, the method comprising the steps of (a) detecting as angular displacement of the crank shaft or the fly wheel of the press; (b) calculating an angular velocity based on said detected angular displacement; 9c) calculating a pressure load value, a torsion load value an energy load value, and a power load value based on the calculated angular velocity; (d) determining whether the respective calculated load values exceed their respective permitted safe load limits; and (e) generating an overload signal sent to the braking means to actuate it to brake the press, and to the hydraulic buffer means to release the hydraulic buffer means when at least one of the calculated values exceeds its permitted safe load limit.

In accordance with another aspect of the present invention, an apparatus for protecting a press, which includes a fly wheel, a crank shaft connected with the fly wheel, a ram having hydralic buffer means mounted therein connected with the crank shaft, and braking means, from being damaged by pressure overload, torsion overload, energy overload, or power overload, the apparatus comprising detecting means for detecting the angular displacement of the crank shaft or of the fly wheel of the press, velocity calculating means for calculating as angular velocity based on said detected angular displacement received from said detecting means; laod calculating means for calculating a pressure load value, a torsion load value, an energy load value, and a power load value based on the calculated angular velocity received from the velocity calculating means; determining means for respectively determining whether the calculated load values exceed their respective permitted safe load limits; and generating means for generating an overload signal, coupled to the braking means and to the hydraulic buffer means, sending out the overload signal to the braking means to actuate it to brake the press and to the hydrualic buffer means to release the hydraulic buffer means when at least one of the calculated values exceeds its permitted safe load limits.

BRIEF DESCRIPTION OF THE DRAWINGS

The present invention will be more fully understood from the following detailed description, taken in connection with the accompanyng drawings which form an integral part of this application and in which.

DETAILED DESCRIPTION OF THE PREFERRED EMBODIMENT

Figure 1:
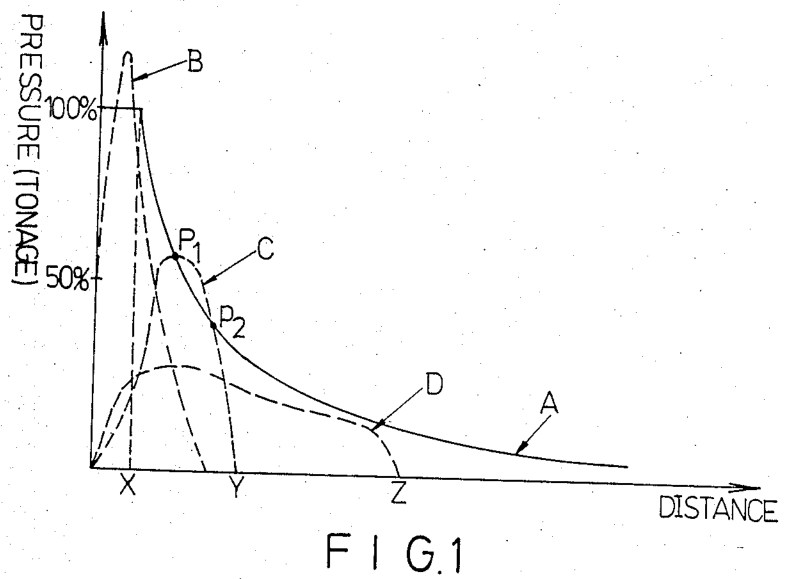
FIG. 1 is a graph of the press capacity curve of the press and the overload characteristic curves.
Figure 2:
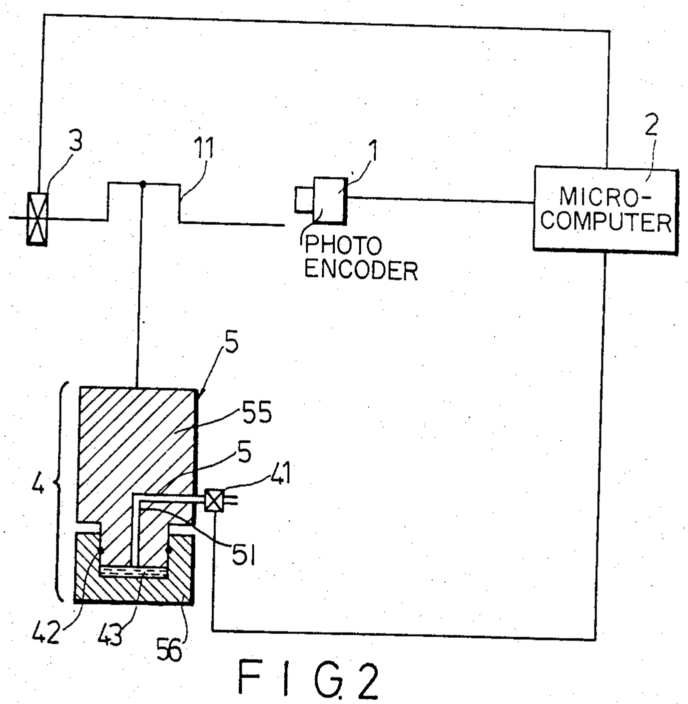
FIG. 2 is a schematic view of the press mounted with the protecting apparatus in accordance with one preferred embodiment of the present invention.
Figure 3:
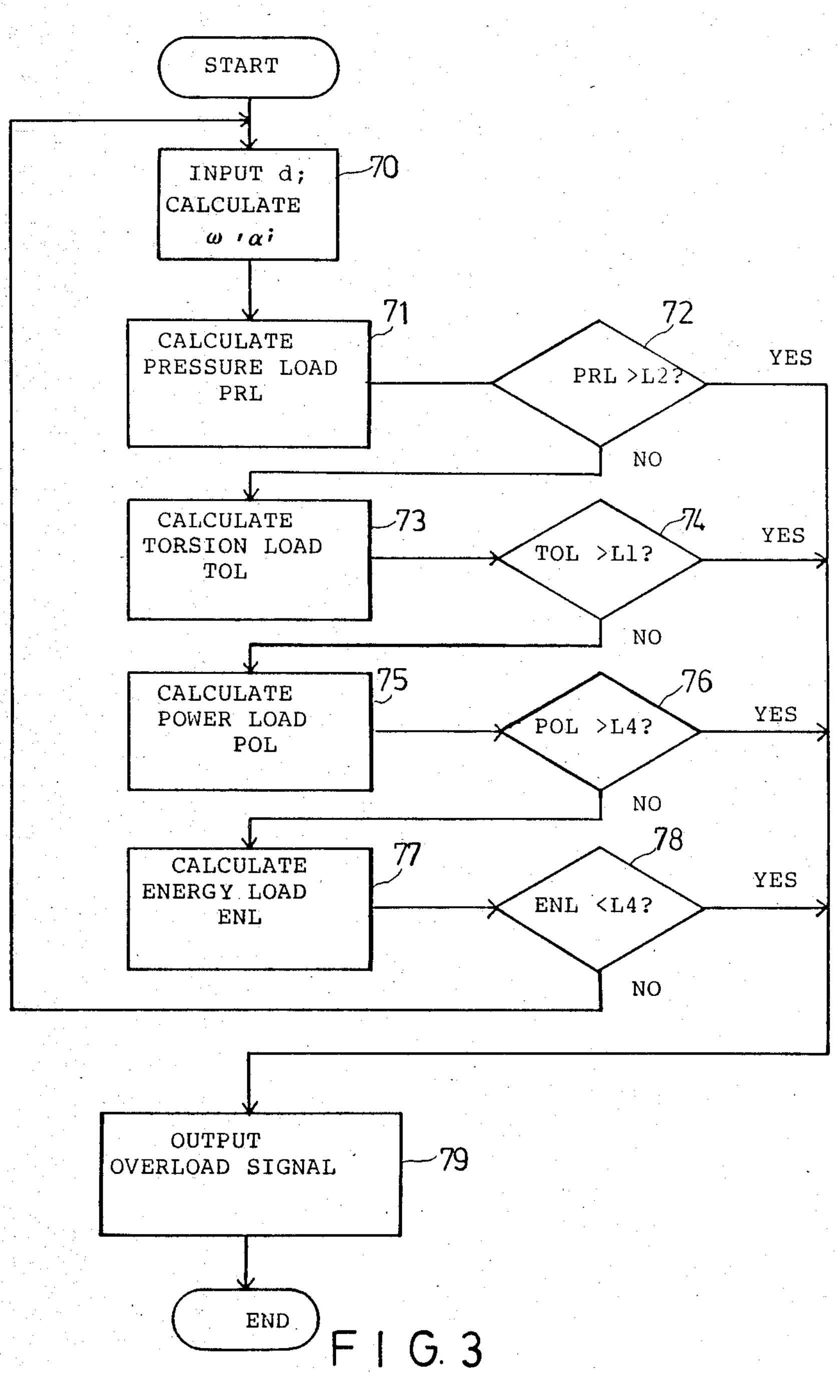
FIG. 3 is a software flowchart showing one way a microcomputer can be programmed to provide proper controls for braking means and hydraulic buffer means of the press.

Referring now to FIG. 2, according to the present invention, an apparatus for protecting a press from being damaged by pressure, torsion, power, or energy overload conditions, comprises a photo-encoder 1, and a microcomputer 2. The press roughly includes a fly wheel (not shown) driven by a drive motor (not shown), a crank shaft 11 connected with the fly wheel, a ram 5, having hydraulic buffer means 4 mounted therein, connected with the crank shaft 11, and braking means 3 for braking the press. The photo-encoder 1 is provided beside the crank shaft 11 for detecting the angular displacement d of the crank shaft 11. The detected value d is then inputted to the microcomputer 2, which s coupled to the photo-encoder 1, for it to calculate an angular velocity $\omega$, an angular acceleration $\alpha$, and a pressure load value PRL, a torsion load value TOL, an energy load value ENL, and a power load value POL, as best seen in steps 70, 71, 73, 75, and 77 of FIG. 3. When one of the calculated load values exceeds its permitted safe load limit, i.e. the pressure safe load limit L2, the torsion safe load limit L1, the power safe load limit L4, or the energy safe load limit L3, as shown in steps 72, 74, 76, 78, the microcomputer 2 outputs an overload signal to the braking means 3 and to the hydraluic buffer means 4, as shown in step 79, both being coupled to the microcomputer 2. In response to the overload signal, the braking means 3 will brake the press, and the oil relieving valve 41 of the hydraulic buffer means 4 will immediately be opened for draining the high pressure oil so as to reduce the impulse of the ram 5.

The hydraulic buffer means 4 is mounted between an upper block 55 and a lower block 56 of the ram 5, and one end of the upper block 55 is accommodated within the lower block 56. The hydraulic buffer means includes an oil seal 42 provided between the connective portions of the upper and lower blocks 55 and 56, a high pressure oil 43 filled within the gap between the upper block 55 and the lower block 56, an oil passage 51 communicated with the high pressure oil 43, and the relieving valve 41 which is opened to drain the high pressure oil in response to the overload signal from the microcomputer 2.

In this embodiment, the microcomputer 2 may use the MF-III microcomputer which utilizes Z-80 CPU, and is manufactured by Multitech Industrial Corporation, Taiwan, R.O.C. The photo-encoder 1 may use the RE-40-400-211-1 manufactured by COPAL, Japan. However, it should be understood that other kinds of microcomputers can also be used.

Although those skilled in the art could calculate the pressure, torsion, power, and energy loads PRL, TOL, POL, and ENL from reading the above descriptions, the manner of calculation used in this embodiment will be roughly described hereafter.

According to the Newton's second Law $F=ma$, the torsion load equation is $T=J\alpha$ wherein T is the torque the press provides;

J is the moment of inertia of the motion mechanism of the press;

$\alpha$ is the angular acceleration of the crank shaft or the fly wheel of the press.

Figure 4A:
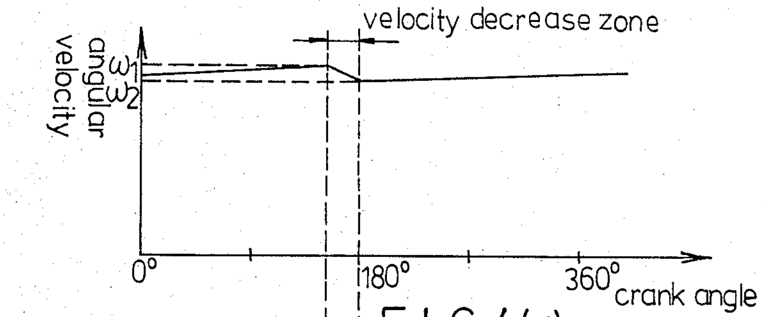
FIGS. 4(*a*) and 4(*b*) are respectively graphs of the angular velocity curve, and the angular acceleration curve, during one working stroke of the ram.
Figure 4B:
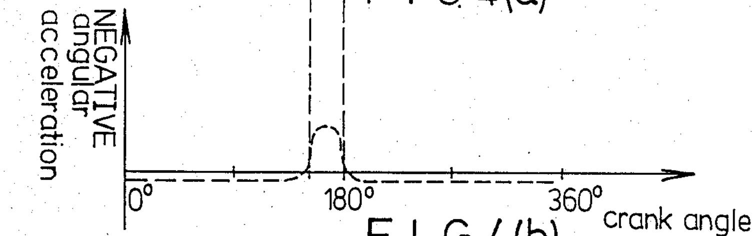

Since most inertia is designed in the fly wheel when the pressing action has occurred, and the inertia of the accessories, such as the die, is so small that it can be ignored, the total moment of inertia can be deemed as a constant. Accordingly, once the angular acceleration is detected, the torsion load can be calculated in accordance with the equation $TOL=J^{*}(-\alpha)$. Then, the microcomputer 2 will determine whether TOL is larger than L1, and whether the overload signal should be outputted. With reference to FIGS. 4(*a*) and 4(*b*), the angular velocity $\omega$ and the angular acceleration $\alpha$ change sharply within the velocity decrease zone of the ram 5 near the lower dead center.

As to the calculation of the pressure load, from the equation $T=\vec{F}\times\vec{r}_o$, wherein $r_o$ is the eccentric radius of the crank shaft, and the force Ft of the force F applying in vertical direction is changed following the rotational angle $\theta$ of the crank shaft, i.e. $F_t=f(r_o, \theta)\cdot T$, the presure load PRL=Ft can be obtained from multiplication of the torsion load and the current function value $f(r_o, \theta)$. The function values of the function $f(r_o, \theta)$ can be obtained beforehand by experiment, and then established as a table to be recorded in the microcoputer 2. Hence, when calculating the pressure load PRL, the current function value is able to be obtained from the recorded table.

As to the calculation of the power load, it can be obtained from the energy change between the moments before and after the velocity decrease zone. Referring to FIG. 4(*a*), the energy change $\Delta E=\frac{1}{2}J(\omega_1^2-\omega_2^2)$ wherein $\omega_1$ is the angular velocity before the velocity decrease zone; and $\omega_2$ is the angular velocity after the velocity decrease zone.

Therefore, when the energy change ΔE, or the energy loss, i.e. the power load POL, is larger than the energy L4 the drive motor can provide, the power overload condition occurs.

As to the calculation of the energy load, it can be obtained from the energy stored in the fly wheel or the crank shaft 11. The stored energy ENL equals $\frac{1}{2}J\omega^2$. When the stored energy ENL is smaller than the normally pre-set energy limit L3, the energy overload occurs. Thus, the microcomputer 2 outputs the overload signal to the braking means 3 to brake the press, and to the hydraulic buffer means 4 to open the oil relieving valve 41. Thus it is clear that the present invnetion is capable of effecting the necessary protecting process for the press under pressure, torsion, power, and energy overload conditions.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims which scope is to be accorded the broadest interpretation so as to encompass all such modifications and equivalent structures.

What is claimed is:

1. A method of protecting a press, which includes a fly wheel, a crank shaft connected with said fly wheel, a ram connected with said crank shaft having hydraluic buffer means mounted therein, and braking means, from being damaged by a pressure overload, a torsion overload, an energy overload, or a power overload, said method comprising the steps of:

(a) detecting an angular displacement of said crank shaft or said fly wheel of said press;

(b) calculation an angular velocity based on said detected angular displacement;

(c) calculating a pressure load value, a torsion load value, an energy load value, and a power load value based on said calculated angular velocity;

(d) respectively determining whether said calculated load values exceed their respective permitted safe load limits; and (e) generating an overload signal sent to said braking means to actuate it to brake said press, and to said hydraulic buffer means to release said hydraulic buffer means when at least one of said calculated values exceeds its permitted safe load limit.

2. A method as clamed in claim 1, wherein said step (c) includes the steps of calculating an angular acceleration based on said angular velocity, and multiplying said angular acceleration with a predetermined torsion load constant to obatin said torsion load value.

3. A method as claimed in claim 2, wherein said step (c) includes the steps of establishing a functiont able for force function values in relation to the vertical force exerted by said crank shaft at each predeterined rotational angle crank shaft at each predetermined rotational angle interval of said crank shaft, and multiplying said current torsion load value with current force function value retrieved from said function table corresponding to the rotational angle of said crank shaft to obtain said pressure load value.

4. A method as claimed in claim 3, wherein said step (c) includes the step of calculating the difference between the energy load value before pressing, and the energy load value after pressing, to obtain said power load value.

5. A method as claimed in claim 4, wherein said step (c) includes the step of calculating the energy stored in said fly wheel to obtain said energy load value.

6. An apparatus for protecting a press, which includes a fly wheel, a crank shaft connected with said fly wheel, a ram connected with said crank shaft having hydraulic buffer means mounted therein, and braking means, from being damaged by a pressure overload, a torsion overload, an energy overload, or a power overload, said apparatus comprising:

detecting means for detecting an angular dispalcement of said crank shaft or said fly wheel of said press;

velocity calculating means for calculating an angular velocity based on said detected angular dispalcement received from said detecting means;

load calculating means for calculating a pressure load value, a torsion load value, an energy load value, and a power load value based on said calculated angular velocity received from said velocity calculating means;

determining means for respectively determining whether said calculated load values exceed their respective permitted safe load limits;

generating means for generating an overload signal, coupled to said braking means and said hydraulic buffer means, sending out said overload signal to said braking means to actuate it to brake said press and to said hydraulic buffer means to release said hydraulic buffer means when at least one of said calculated values exceeds its permitted safe load limit.

7. An apparatus as claimed in claim 6, wherein said load calculating means includes means for calculating an angular acceleration based on said angular velocity, and means for multiplying said angular acceleration with a predetermined torsion load constant to obtain said torsion load value.

8. An apparatus as claimed in claim 7, wherein said load calculating means includes means for establishing a function table for force function values in relation to the vertical force exerted by said crank shaft at each predetermined rotational angle interval of said crank shaft, and means for multiplying said current load value with current force function value retrieved from said function table corresponding to the rotational angle of said crank shaft to obtain said pressure load value.

9. An apparatus as claimed in claim 8, wherein said load calculating means includes means for calculating the difference between the energy load value before pressing, and the energy load value after pressing, to obtain said power load value.

10. An apparatus as claimed in claim 9, wherein said load calculating means includes means for calculating the energy stored in said fly wheel to obtain said energy load value.

11. An apparatus as claimed in claim 10, wherein said velocity calculating means, said load calculating means, said determining means, and said generating means are accomplished by a digital information processor.

* * * * *